US008405871B2

(12) United States Patent
Smith et al.

(10) Patent No.: US 8,405,871 B2
(45) Date of Patent: Mar. 26, 2013

(54) AUGMENTED REALITY DYNAMIC PLOTS TECHNIQUES FOR PRODUCING AND INTERACTING IN AUGMENTED REALITY WITH PAPER PLOTS FOR WHICH ACCOMPANYING METADATA IS ACCESSIBLE

(75) Inventors: Mark D. Smith, Huntsville, AL (US); Alton B. Cleveland, Jr., Glenmoore, PA (US); Stephane Cote, Lac Beauport (CA)

(73) Assignee: Bentley Systems, Incorporated, Exton, PA (US)

( * ) Notice: Subject to any disclaimer, the term of this patent is extended or adjusted under 35 U.S.C. 154(b) by 858 days.

(21) Appl. No.: 12/557,392

(22) Filed: Sep. 10, 2009

(65) Prior Publication Data

US 2011/0058187 A1 Mar. 10, 2011

(51) Int. Cl.
*G06F 3/12* (2006.01)
*G06K 15/02* (2006.01)
*G06K 15/10* (2006.01)
*H04N 1/00* (2006.01)
*H04N 1/60* (2006.01)

(52) U.S. Cl. .......... 358/1.9; 358/1.15; 358/1.2; 358/1.5; 358/1.6

(58) Field of Classification Search .................. 358/1.9, 358/1.15, 3.23, 3.12, 1.2, 1.5, 1.6, 508, 509, 358/527, 401, 409, 444, 448, 450, 471, 482, 358/488, 296; 348/207.2, 14.01, 14.05, 14.07, 348/14.12, 63, 47, 73, 207.1, 211.14, 240, 348/99, 234; 382/113, 130, 158, 164, 165, 382/190, 254, 276, 287, 291, 293, 298, 305, 382/307, 313; 345/626, 163, 161, 162, 173, 345/181, 502, 520, 203, 600, 617, 621, 623
See application file for complete search history.

(56) References Cited

U.S. PATENT DOCUMENTS

| 7,945,339 B2 * | 5/2011 | Blevins et al. .................. 700/29 |
| 2005/0134707 A1 * | 6/2005 | Perotti et al. .................. 348/239 |
| 2009/0059261 A1 * | 3/2009 | Sato ............................ 358/1.13 |

OTHER PUBLICATIONS

Hull et al., Paper-Based Augmented Reality, 2007, IEEE International Conference on Artificial and Telexistence, all pages.*
Hecht et al., WikEye—Using Magic Lenses to Explore Georeferenced Wikipedia Content, May 2007, PERMID proceeding, all pages.*

(Continued)

*Primary Examiner* — Benny Q Tieu
*Assistant Examiner* — Ngon Nguyen
(74) *Attorney, Agent, or Firm* — Cesari and McKenna, LLP

(57) ABSTRACT

In one embodiment, a special paper plot (referred to herein as a dynamic plot) for which corresponding metadata is maintained is printed. A mobile appliance obtains corresponding metadata for the dynamic plot. A camera of the mobile appliance computes an image of the dynamic plot. A position of the camera of the mobile appliance with respect to the dynamic plot is calculated from the image of the dynamic plot. Using the calculated position, information or icons are overlaid at particular locations in the image captured by the camera of the dynamic plot. The image captured by the camera of the dynamic with the overlaid information or icons is then displayed on a display screen of the mobile appliance. A user may add annotations beyond what is printed on the dynamic plot. This information may subsequently be shared with other users involved in the project.

15 Claims, 16 Drawing Sheets

OTHER PUBLICATIONS

Arth, Clemens, et al., "Wide Area Localization on Mobile Phones," Graz University of Technology, Austria, 2009, pp. 1-10.

Hecht, Brent, et al., "WikEye—Using Magic Lenses to Explore Georeferenced Wikipedia Content," Proceedings of the 3rd International Workshop on Pervasive Interaction Devices (PERMID), Toronto, Ontario, Canada, May 13, 2007, pp. 1-5.

Rohs, Michael, et al., "Towards Real—Time Markerless Tracking of Magic Lenses on Paper Maps," Adjunct Proceedings of the 5th International Conference on Pervasive Computing (Pervasive), Late Breaking Results, pp. 69-72, Toronto, Ontario, Canada, May 13-16, 2007, pp. 1-4.

Schoning, Johannes, et al., "WikEar—Automatically Generated Location-Based Audio Stories between Public City Maps," Demonstration at UBICOMP 2007, Innsbruck, Austria, Sep. 16-19, 2007, pp. 1-4.

Schoning, Johannes, et al., "Paper Maps as an Entry Point for Tourists to Explore Wikipedia Content," Demonstration at the 9th International Conference on Multimodal Interfaces (ICMI), Nagoya, Japan, Nov. 12-15, 2007, pp. 1-2.

Wagner, Daniel, "Map Tracking," Handheld Augmented Reality, Christian Doppler Laboratory, Graz University of Technology, http://studierstube.icg.tu-graz.ac.at/handheld ar/maptrackinq.php, Sep. 6, 2009, pp. 1-3.

"Notification of Transmittal of the International Search Report and the Written Opinion of the International Searching Authority, or the Declaration," International Filing Date: Apr. 6, 2010, International Application No. PCT/US2010/001039, Applicant: Bentley Systems, Incorporated, Date of Mailing: Jun. 30, 2010, pp. 1-14.

Mackay, Wendy, "Augmented Reality: Linking Real and Virtual Worlds: A New Paradigm for Interacting with Computers," Proceedings of AVI'98, ACM Conference on Advanced Visual Interfaces, ACM Press, New York, Jan. 1, 1998, pp. 1-9.

Hull, Jonathan, et al., "Paper-Based Augmented Reality,"17th International Conference on Artificial Reality and Telexistence, IEEE, IEEE Computer Society, Nov. 1, 2007, pp. 1-5.

Smith, Susan, "Bentley's ProjectWise Dynamic Plot for Design Review," AECCafe Weekly, Retrieved from the Internet: [http://www10.aeccafe.com/nbc/articles/view_weekly.php?section=Magazine&articleid=706940&printerfriendly=1], Jun. 15, 2009, pp. 1-8.

* cited by examiner

AUGMENTED REALITY DYNAMIC PLOTS TECHNIQUES FOR PRODUCING AND INTERACTING IN AUGMENTED REALITY WITH PAPER PLOTS FOR WHICH ACCOMPANYING METADATA IS ACCESSIBLE

BACKGROUND

1. Technical Field

The present disclosure relates generally to information management at a worksite and more specifically to techniques for producing and/or interacting in augmented reality with paper plots for which accompanying metadata is accessible.

2. Background Information

Many worksites, for example construction sites, are not conducive to the use of traditional computing equipment. Traditional desktop and notebook computers typically require some type of indoor office environment to be used comfortably. For example, one typically requires some type of a table on which to place the desktop or notebook computer, and some type of chair in which to sit while operating the computer. In attempts to accommodate such requirements, temporary offices (e.g., trailers) may be brought to the worksite. However, tying computing equipment to a temporary office has a number of disadvantages. For example, the temporary office is typically placed at a fixed location at the worksite remote from the work activities. One generally cannot simultaneously view a portion of the construction project of interest and operate the computing equipment at the same time.

While more portable computing equipment, such as ultra mobile personal computers (PCs) (collectively UMPCs) and/or cellular telephones may be employed, the user interfaces conventionally found on such equipment has hindered their use at worksites. Such equipment typically include small navigation controls (e.g., small buttons), which may be difficult to select by a user due to their size and proximity to other controls. Further, such equipment typically includes small display screens, which may limit a user to viewing only a small portion of a large plot at any one time (with features displayed at a discernable size).

Given the limitations of conventional computing equipment, field works have previously generally employed an inefficient amalgam of techniques to perform tasks at worksites. Commonly, paper plots are printed using desktop and/or notebook computers (and attached peripherals) in the temporary office, and these paper plots are then carried to the location of the work activities. There, the field worker may read the information printed on the paper plots, and use such information in making decisions, instructing other field workers, and the like. Should different (e.g., more detailed) information be required concerning some aspect of the paper plot, the field worker may need to make a trip back to the temporary office and print out additional information. This may occur repeatedly as the field worker discovers information is needed, and has to travel back and forth to the temporary office to retrieve it.

Further, while at the location of work activities, the field worker may desire to capture a variety of types of field data for planning, inspection, project revision and other purposes. The field worker may annotate (e.g., make pen or pencil markings) on the paper plots. They may take photographs of the location of work activities with a camera (e.g. a digital camera). Further, they may record information about each photograph, as well as other types of note, by hand in a field notebook or on other papers. Similarly, they may dictate audio notes into a recording device.

Once the field data has been collected, the field work may travel back to the temporary office and update computer aided design (CAD) and database files accessible via the desktop and notebook computers, in light of the annotations on the paper plots, photographs, and hand written notes in the field notebook. As is apparent, there are numerous disadvantages inherent to this process. First, it is inconvenient to have to return to the temporary office in the first place. Further, the update of the CAD and database files once at the temporary office can be labor intensive and error prone. The relationship between the annotations on the paper plots, photographs, field notes and/or audio recordings and other project data maintained in the CAD and database files is often maintained in the field worker head (i.e. in their memory) or in cryptic notes recorded in their field notebook. The field worker typically must describe such relationships accurately when updating CAD and database files, or important relationship information may be lost. Even if no relationship information is lost, the entire process may be time consuming and burdensome for the field worker.

Accordingly, there is a need for improved techniques for information management at a worksite, including techniques for delivering information related to paper plots and capturing information related to the paper plots.

SUMMARY

In one embodiment, a special paper plot (referred to herein as a dynamic plot) is printed and corresponding metadata is created and saved during the printing process. A user (e.g., a field worker) may subsequently interact with the dynamic plot using a mobile appliance having a camera and a display screen that shows an augmented reality view of the plot.

For example, a camera of the mobile appliance may be used to capture an identifier (e.g., a barcode) printed on the dynamic plot, which is subsequently decoded to determine the unique plot ID. Using the unique plot ID, corresponding metadata for the dynamic plot may be obtained. The camera may further capture images of a blueprint, schematic, elevation, rendering, etc. represented in the dynamic plot. These images may be augmented using augmented reality techniques before display on the display screen of the mobile appliance.

Specifically, the images and a portion of the metadata may be used to calculate a position of the camera of the mobile appliance with respect to the dynamic plot via pose estimation. With such position known, the images of the dynamic plot may be supplemented (e.g., overlaid) with additional information beyond that which is printed on the dynamic plot. For example, a field worker may query the properties of an object printed on the dynamic plot using the mobile appliance, and such properties may be overlaid in the images shown on the display screen of the mobile appliance. Similarly, the field worker may use the mobile appliance to place annotations beyond what is printed on the dynamic plot. In such manner, information may be delivered beyond that printed on the dynamic plot and/or to additional information captured to build upon the information printed on the dynamic plot. This information may subsequently be shared with other workers involved in the project.

BRIEF DESCRIPTION OF THE DRAWINGS

The description below refers to the accompanying drawings of example embodiments, of which.

DETAILED DESCRIPTION

I. Definition of Terms

As used herein the term "plot" shall be understood to refer to a visual representation of information that may be maintained in an electronic file stored on a computer-readable medium and/or printed on a piece of paper or other flat surface. A plot may take the form of a computer aided design (CAD) drawing, such as a blueprint, a schematic, an elevation, a rendering, etc., or another type of representation, such as a photographic image, a text listing, etc.

As used herein the term "paper plot" shall be understood to refer to a plot printed on a piece of paper or other flat surface. A paper plot shall not include copies maintained in an electronic file stored on a computer-readable medium.

As used herein the term "electronic plot" shall be understood to refer to a plot maintained in an electronic file stored on a computer-readable medium. An electronic plot may take the form of a MicroStation® design (.dgn) file, an AutoCAD® drawing (.dwg) file, a Portable Document Format (.pdf) file, a Joint Photographic Experts Group (.jpg) file, or other type of file. An electronic plot shall not include copies printed on a piece of paper.

As used herein the term "dynamic plot" shall be understood to refer to a paper plot for which corresponding metadata stored on a computer-readable medium is available. The metadata shall comprise information beyond that which is printed on the paper plot.

As used herein the term "mobile appliance" shall be understood to refer to an electronic device and that is adapted to be readily transportable by a user, for example, is adapted to be carried by the user on their person. A "mobile appliance" may be an ultra mobile personal computer (PC) (collectively UMPC), a tablet PC, a personal digital assistant (PDA), an electronic book (e-book) reader, a cellular telephone, a digital camera, or other similar type of portable electronic device.

As used herein the term "augmented reality" shall be understood to refer to a combination of real-world and computer-generated data, where computer-generated data is blended into real-world-sourced images in real time.

II. Example Embodiments

Figure 1:
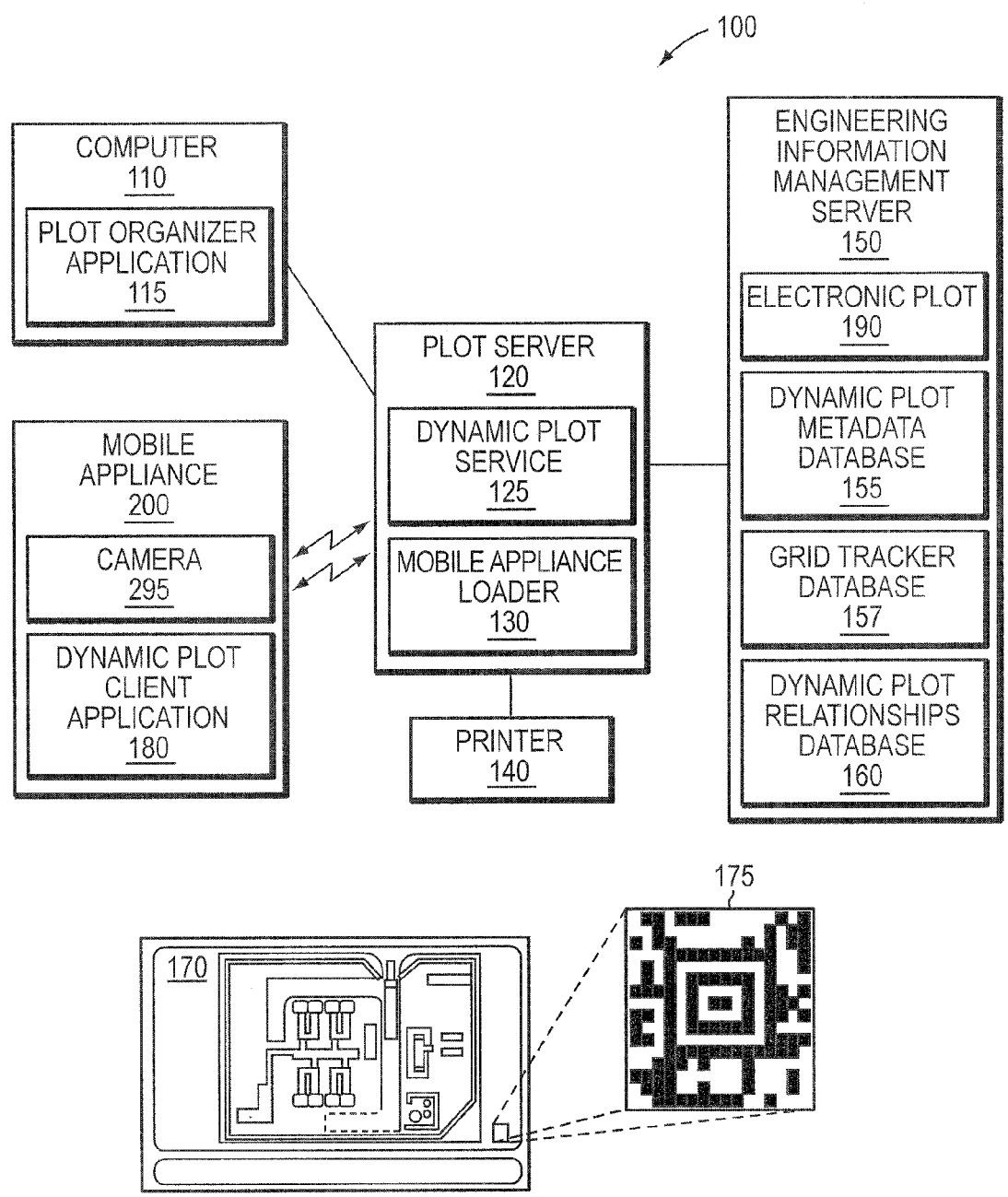
FIG. 1 is a schematic block diagram of an example architecture that may be used to produce and interact with a dynamic plot.

FIG. 1 is a schematic block diagram of an example architecture 100 that may be used to produce and interact with a dynamic plot. While not explicitly shown in FIG. 1, it should be understood that each of the computers and servers depicted may include conventional computing hardware, including one or more processors configured to execute instructions stored in a computer-readable medium, such as a volatile or persistent memory, a hard-disk, a compact disk (CD), etc. Further, it should be understood that each of the computers and servers may be interconnected by any of a variety of network connections, including both wired and wireless connections.

The example architecture 100 includes a computer 110 executing a plot organizer application 115 that organizes and submits electronic plots for printing and/or archiving. While the plot organizer application 115 may take on any of a variety of forms, in one configuration, the plot organizer application 115 is a ProjectWise InterPlot® Organizer available from Bentley Systems, Inc. of Exton, Pa.

The example architecture 100 further includes a plot server 120 that includes functionality to processes electronic plot print jobs from the plot organizer application 115, and to retrieve and pass data to an engineering information management server 150 as needed. The plot server 120 is further configured to send data to a printer 140 to produce at least one dynamic plot 170. The plot server 120 may execute a dynamic plot service 125 and a mobile application loader 130 to enable creation and use of dynamic plots, the operation of such software being discussed in more detail below. While the plot server 120 may take on any of a variety of forms, in one configuration, the plot server 120 is a ProjectWise® Plot Server available from Bentley Systems, Inc. of Exton, Pa.

The engineering information management server 150 may maintain at least one electronic plot 190, as well as a variety of types of other engineering data. As part of the maintained data, the engineering information management server 150 may include a dynamic plot metadata database 155 storing information concerning dynamic plot properties, related manifests, related renderings, related object properties data, and other engineering data. The dynamic plot metadata database 155 may further include a grid tracker database 157 used with pose estimation techniques discussed below. Further, the engineering information management server 150 may also store a dynamic plot relationships database 160 that maps unique plot identifiers associated with dynamic plots to file global unique identifier (GUID) and other payload information used in identifying corresponding electronic plots and metadata in the engineering information management server 150. Further detail regarding the dynamic plot metadata database 155, the grid tracker database 157, and the dynamic plot relationships database 160 is provided further below. While the engineering information management server 150 may take on any of a variety of forms, in one configuration, the engineering information management server 150 is a ProjectWise® Server available from Bentley Systems, Inc. of Exton, Pa.

The example architecture 100 further includes at least one dynamic plot 170, for example, a dynamic plot printed by printer 140. The dynamic plot 170 may represent a blueprint, a schematic, an elevation, a rendering, an image, a text listing, and/or other similar types of information that has corresponding metadata stored on a computer-readable medium, for example, corresponding metadata stored in the dynamic plot metadata database 155 maintained by the engineering information management server 150. As discussed in more detail below, the dynamic plot 170 may include an identifier, for example a barcode 175, that indicates a unique plot ID associated with the dynamic plot 170. The unique plot ID may be used in accessing the corresponding metadata in the engineering information management server 150 used in creating augmented reality views of the dynamic plot 170.

The example architecture 100 further includes a mobile appliance 200 including a camera 295, and configured to execute a dynamic plot client application 180. The mobile appliance 200 may be a UMPC, a tablet PC, a PDA, an e-book reader, a cellular telephone, a digital camera, or other similar type of portable electronic device. The mobile appliance 200 may communicate with the plot server 200 via a long-range wireless connection, for example, a mobile telephony connection such as a 3G service, or a wireless local area network (LAN) connection, such as a IEEE 802.11-wireless LAN (WLAN) connection. Alternatively, the mobile appliance 200 may communicate with the plot server 120 via a wired link, for example, a universal serial bus (USB) or Ethernet link, or a short-range wireless connection, for example, a Bluetooth connection.

Figure 2:
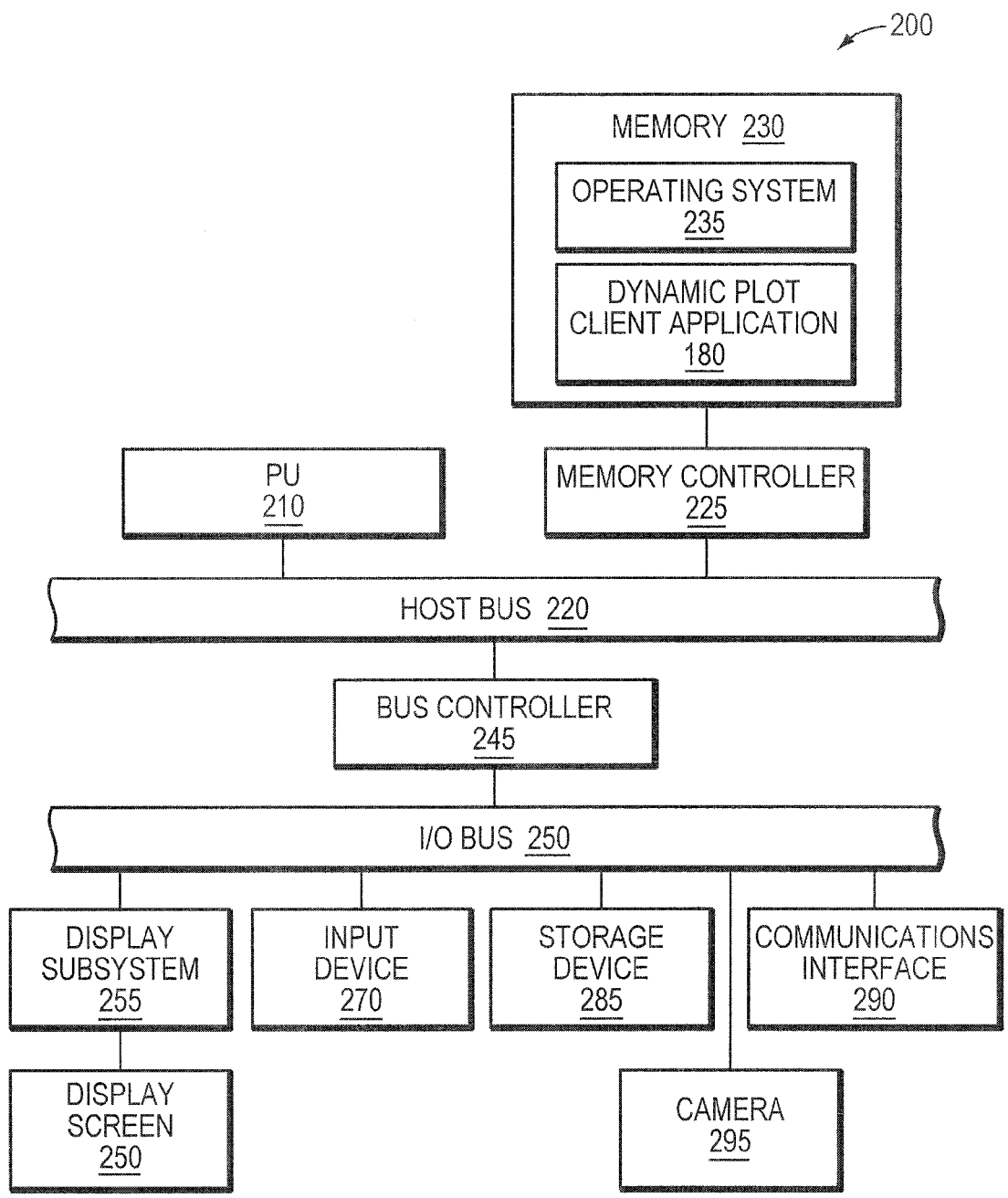
FIG. 2 is a schematic block diagram of an example mobile appliance that may be used in the example architecture of FIG. 1.

FIG. 2 is a schematic block diagram of an example mobile appliance 200 that may be used in the example architecture of FIG. 1. The mobile appliance 200 includes at least one processing unit (PU) 210 coupled to a host bus 220. The PU 110 may be any of a variety of commercially available processors, such as an Intel x86 processor, or another type of processor. A volatile memory 230, such as a Random Access Memory (RAM), is coupled to the host bus 220 via a memory controller 225. The memory 230 is configured to store at least a portion of an operating system 235 while the portable electronic device 100 is operating.

In addition, the memory 230 may store portions of application software, including portions of the dynamic plot client application 180 while the mobile appliance 200 is operating. The host bus 220 of the mobile appliance 200 is coupled to an input/output (I/O) bus 250 through a bus controller 245. A display subsystem 255, coupled to a display screen 260, is coupled to the I/O bus 250. The display screen 260 may show a user interface of the dynamic plot client application 180. One or more input devices 270, such as a keyboard or a touchpad, may also be provided and used for interaction with the mobile appliance 200.

A persistent storage device 285, such as hard disk drive, a solid-state drive, or other type or persistent data store, is coupled to the I/O bus 250, and may persistently store data, including computer-executable instructions. Persistently stored data may be loaded to the volatile memory 230 when needed. For example, computer-executable instructions related to the operating system 235 and the dynamic plot client application 180 may be stored in the persistent storage device 285 until they are needed. The I/O bus 250 may further be coupled to a communication interface 290 that interfaces with the above discussed wireless connection or a wireless connection to the plot server 120

Finally, a camera 295, for example, a video camera such as a webcam, is coupled to the I/O bus 250. As explained in more detail below, the camera 295 may be used to capture the identifier (e.g., the barcode) printed on the dynamic plot 170, which is subsequently decoded to determine the unique plot ID. Using the unique plot ID, corresponding metadata for the dynamic plot 170 may be obtained. The camera 295 may further capture images of the blueprint, schematic, elevation, rendering, etc. represented in the dynamic plot 170, which may be augmented using augmented reality techniques before display in a user interface of the dynamic plot client application 180 on the display screen 260.

Specifically, the images and a portion of the metadata may be used to calculate a position of the camera 295 of the mobile appliance 200 with respect to the dynamic plot 170 via pose estimation. With such position known, the images of the dynamic plot 170 may supplemented with additional information beyond that which is printed on the dynamic plot 170. For example, a user (e.g. a field worker) may query the properties of an object printed on the dynamic plot 170 using the mobile appliance 200 and such properties may be overlaid in the images shown on the display screen 260 of the mobile appliance 200. Similarly, the field worker may use the mobile appliance 200 to add annotations beyond what is printed on the dynamic plot 170. In such manner, information may be delivered beyond that printed on the dynamic plot 170 and/or to additional information captured to build upon the information printed on the dynamic plot 170.

Figure 3:
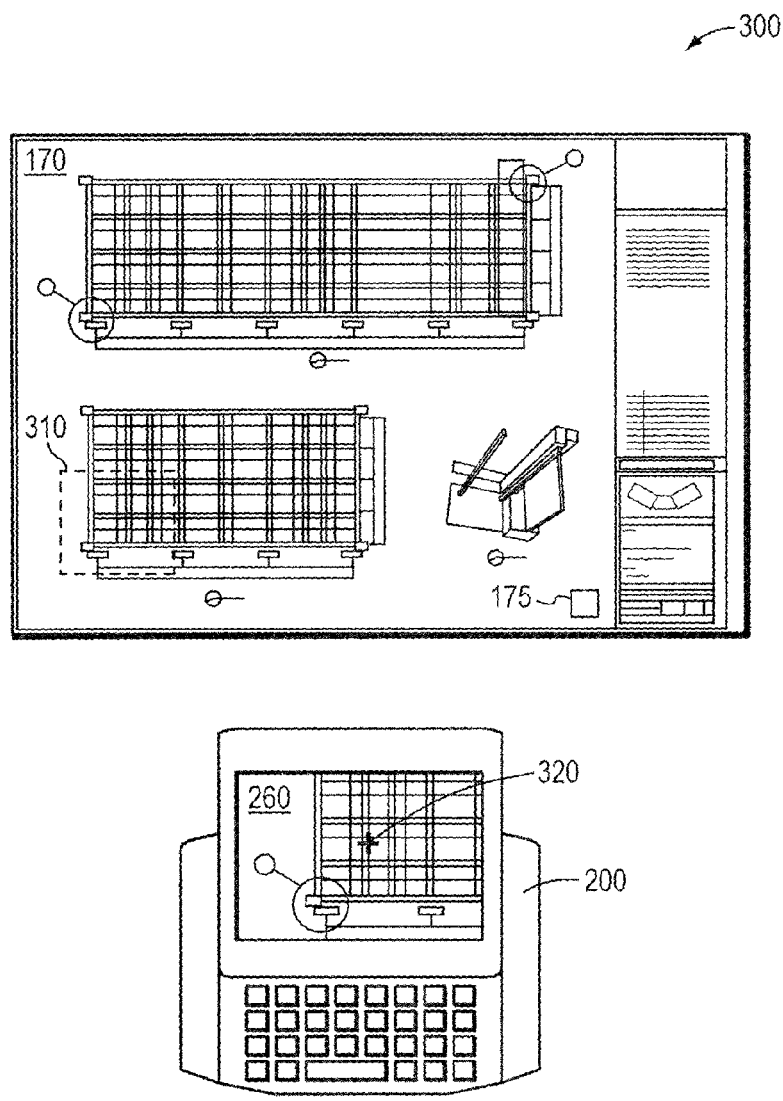
FIG. 3 is a diagram of an example user interface of the dynamic plot client application on a display screen of a mobile appliance, showing a portion of a dynamic plot captured by a camera.

FIG. 3 is a diagram 300 of an example user interface of the dynamic plot client application 180 on a display screen 260 of a mobile appliance 200, showing a portion of a dynamic plot 170 captured by the camera 295. As can be seen in FIG. 3, the dynamic plot 170 includes a schematic diagram of a structure. A portion 310 of that schematic diagram of the structure is captured by the camera 295. Such portion is then displayed in the user interface of the dynamic plot client application 180 on the display screen 260 of the mobile appliance 200. The field worker may reposition the camera 295 of the mobile appliance 200 with respect to the dynamic plot 170, such that a different portion of the schematic diagram will be captured by the camera 295 and displayed in the user interface of the dynamic plot client application 180. For example, the field worker may pan the camera 295 across the dynamic plot 170, and zoom in, or zoom out, on the dynamic plot 170, by adjusting the distance between the camera and the dynamic plot 170.

The portion of the schematic diagram captured by the camera 295 may be supplied to a pose estimation routine to estimate the position of the camera 295 with respect to the dynamic plot 170. Then, as discussed in more detail below, the images on the display screen 260 of the mobile appliance 200 may be augmented with additional information from stored metadata or captured by the field worker, beyond what is printed on the dynamic plot 170.

Figure 4A:
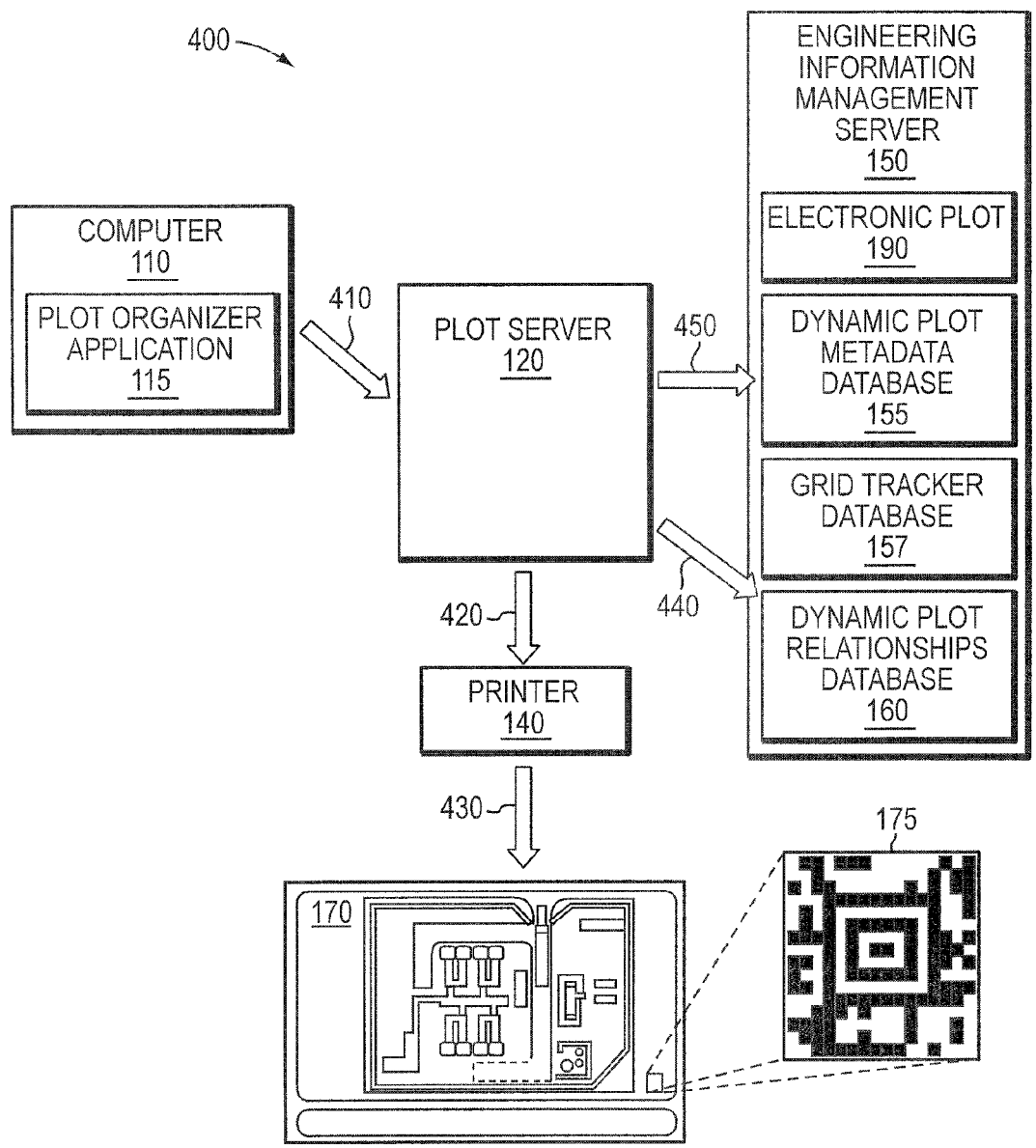
FIG. 4A is a diagram illustrating a technique for creating a link between a dynamic plot and its corresponding metadata maintained in a dynamic plot metadata database.

FIG. 4A is a diagram 400 illustrating a technique for creating a link between a dynamic plot 170 and its corresponding metadata maintained in the dynamic plot metadata database 155. First, a user of the plot organizer application 115 selects an option to print a paper plot from an electronic plot 190. The print dialog provided by the plot organizer application 115 may include a control, for example, a check box, that enables the user to request that the paper plot be printed as a dynamic plot.

At 410, the request is sent to the plot server 120. The plot server 120 assigns the plot a unique plot ID. The plot server 120 further adds an identifier, such as a barcode 175, on the plot that encodes the unique plot ID. Depending on the particular implementation, the barcode 175 may be a one-dimensional barcode, a two-dimensional barcode, a three-dimensional barcode, or some another type of encoding. In addition to adding the identifier (e.g., barcode) on the plot, the plot server may also add markings to the plot for eventual use by a pose estimation routine of the dynamic plot client application 180.

Figure 4B:
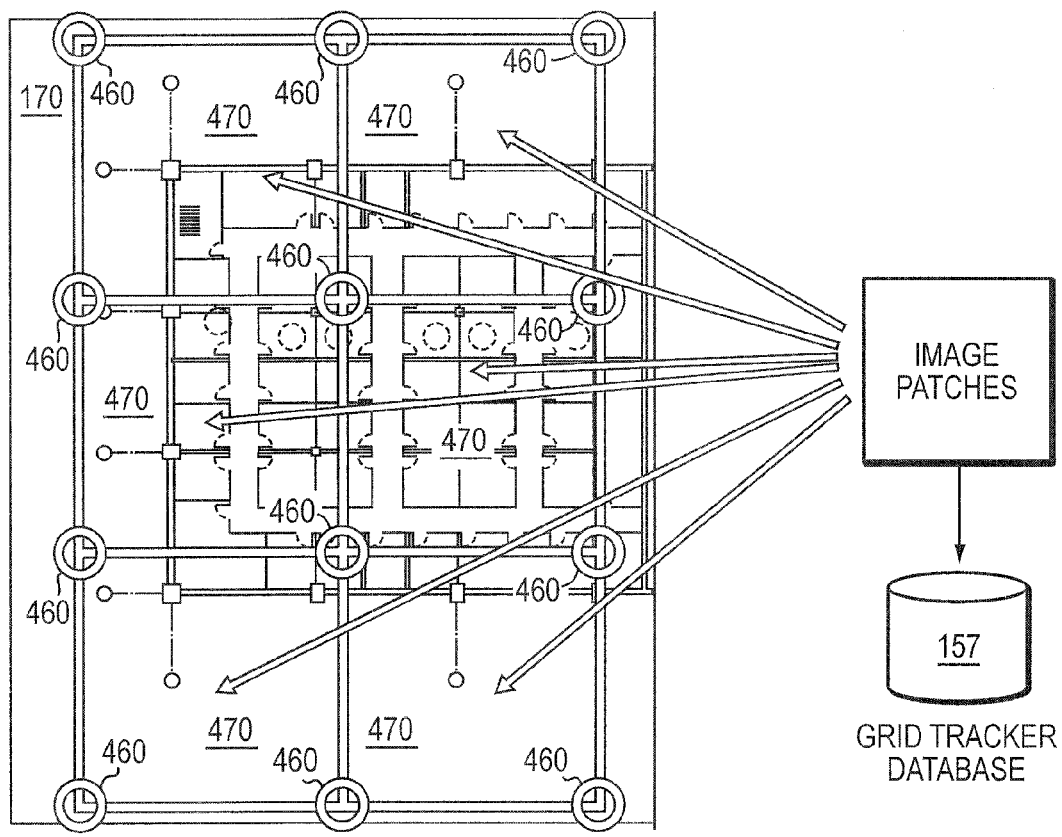
FIG. 4B is a diagram illustrating an example plot divided into a regular grid with markings at the intersection points of the grid.

Referring to FIG. 4B, the plot server 120 may divide the plot into a regular grid. At each of the intersection points of the grid, a marking 460 having a particular shape and color is added to the plot. In one configuration, the marking is a yellow dot. The interior 470 of each square of the grid is considered an "image patch". Each image patch is extracted from the plot and is maintained in memory, for example the grid tracker database 157, for eventual use by a pose estimation routine of the dynamic plot client application 180.

At 420, the plot server 120 sends the plot, including the barcode 175 and markings (e.g., yellow dots) 460, to the printer 140. At 430, the dynamic plot 170 is printed on a sheet of paper or other flat surface. Further, at 440, the plot server 120 creates at least one entry in the dynamic plot relationship database 155 of the engineering information management server 150. The entry maps the unique plot ID in the barcode 175 on the dynamic plot 170 to a file global unique identifier (GUID) and other payload information used in identifying a corresponding electronic plot and metadata in the engineering information management server 150. Similarly, at 450, the plot server 120 creates an entry in the dynamic plot metadata database 160. The entry includes, or points to files that include, metadata with additional information related to the dynamic plot 170. The metadata may include information concerning dynamic plot properties, related manifests, related renderings, related object properties, and other types of engineering data. The metadata further includes transformation information which describes a mapping between a coordinate space used with the engineering data on the engineering information management server 150 and the coordinate space of the dynamic plot 170. A grid tracker database 157 on the engineering information management server 150 may maintain the above described image patches of the plot. After such information is created and stored, the dynamic plot 170 may be ready for use in the field.

Figure 5:
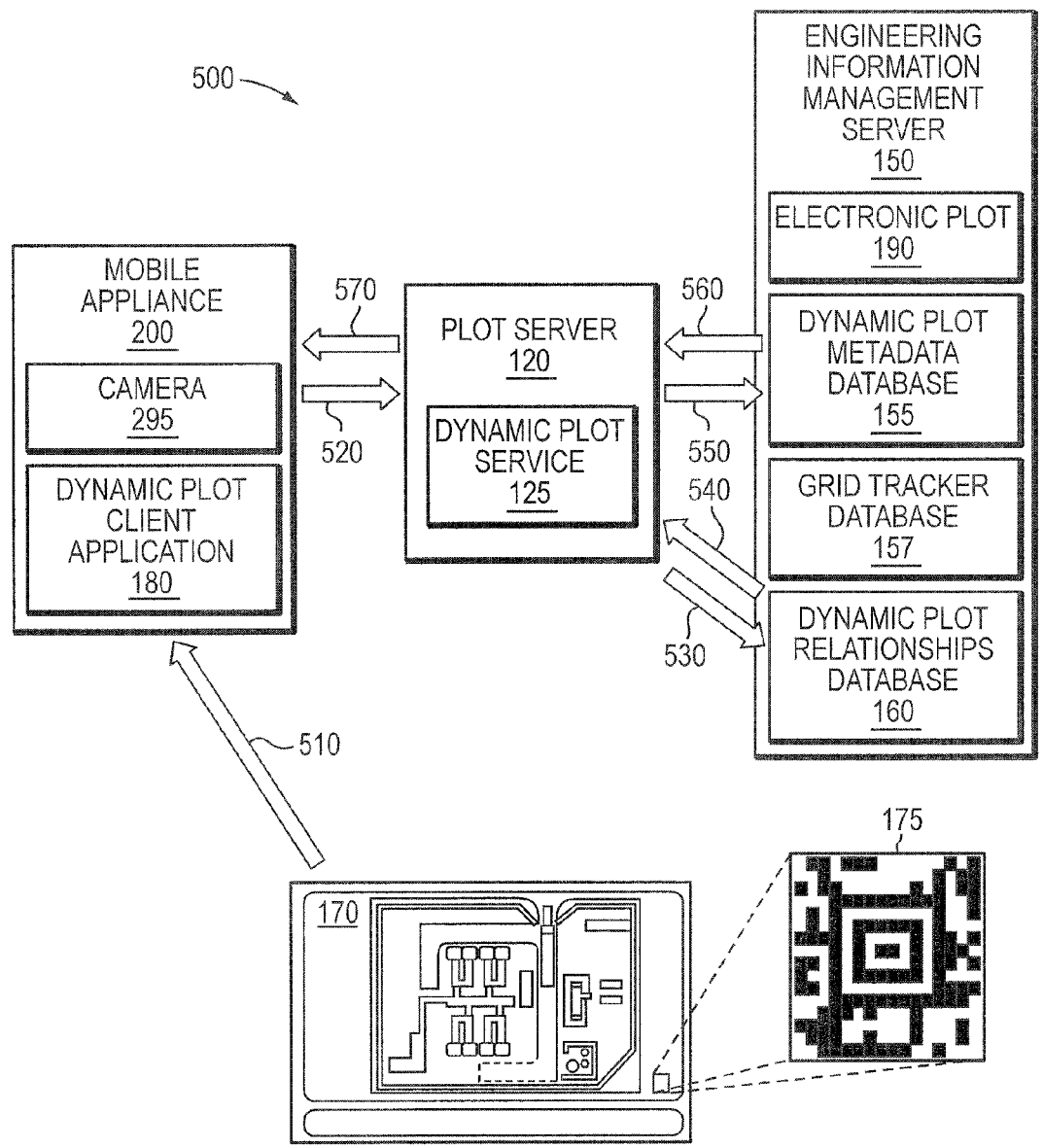
FIG. 5 is a diagram illustrating an example technique for using a dynamic plot in the field where a long-range wireless connection exists between a mobile appliance and a plot server.

FIG. 5 is a diagram 500 illustrating an example technique for using a dynamic plot in the field where a long-range wireless connection exists between the mobile appliance 200 and the plot server 120. Such operations may be initiated when a field worker desires to use the dynamic plot 170 at a worksite. At 510, using the camera 295 of the mobile appliance 200, the field worker photographs the identifier, for example, the barcode 175, on the dynamic plot 170. The dynamic plot client application 180 may decode the identifier (e.g. barcode 175) to obtain a unique plot ID of the dynamic plot 170, and, at 520, forwards the unique plot ID to the dynamic plot service 125 on the plot server 120 over the long-range wireless connection (e.g., the 3G mobile telephony service, IEEE 802.11-wireless LAN (WLAN) connection, etc.). Alternatively, the dynamic plot client application 180 may send an image of the identifier (e.g., barcode 175) over the long-range wireless connection, and leave it to the dynamic plot service 125 to perform any necessary decoding.

At 530, the dynamic plot service 125 queries the dynamic plot relationship database 160 to look up a GUID and other payload information used in identifying a corresponding electronic plot and metadata on the engineering information management server 150. At 540, this information is returned to the dynamic plot service 125. At 550, the dynamic plot service 125 queries the dynamic metadata database 155 and retrieves at least some metadata related to the plot. The dynamic plot service 125 further obtains image patch information stored in the grid tracker database 157 for use by the pose estimation of the dynamic plot client application. At 560, metadata and patch information is returned to the dynamic plot service 125 on the plot server 120. At 570, at least a portion of the metadata and image patch information is forwarded over the long-range wireless connection to the dynamic plot client application 180 on the mobile appliance 200. Some portion of this metadata may then be displayed via augmented reality techniques on the display screen 260 of the mobile appliance 200, to provide a user with information beyond that which is printed on the dynamic plot 170.

Figure 6:
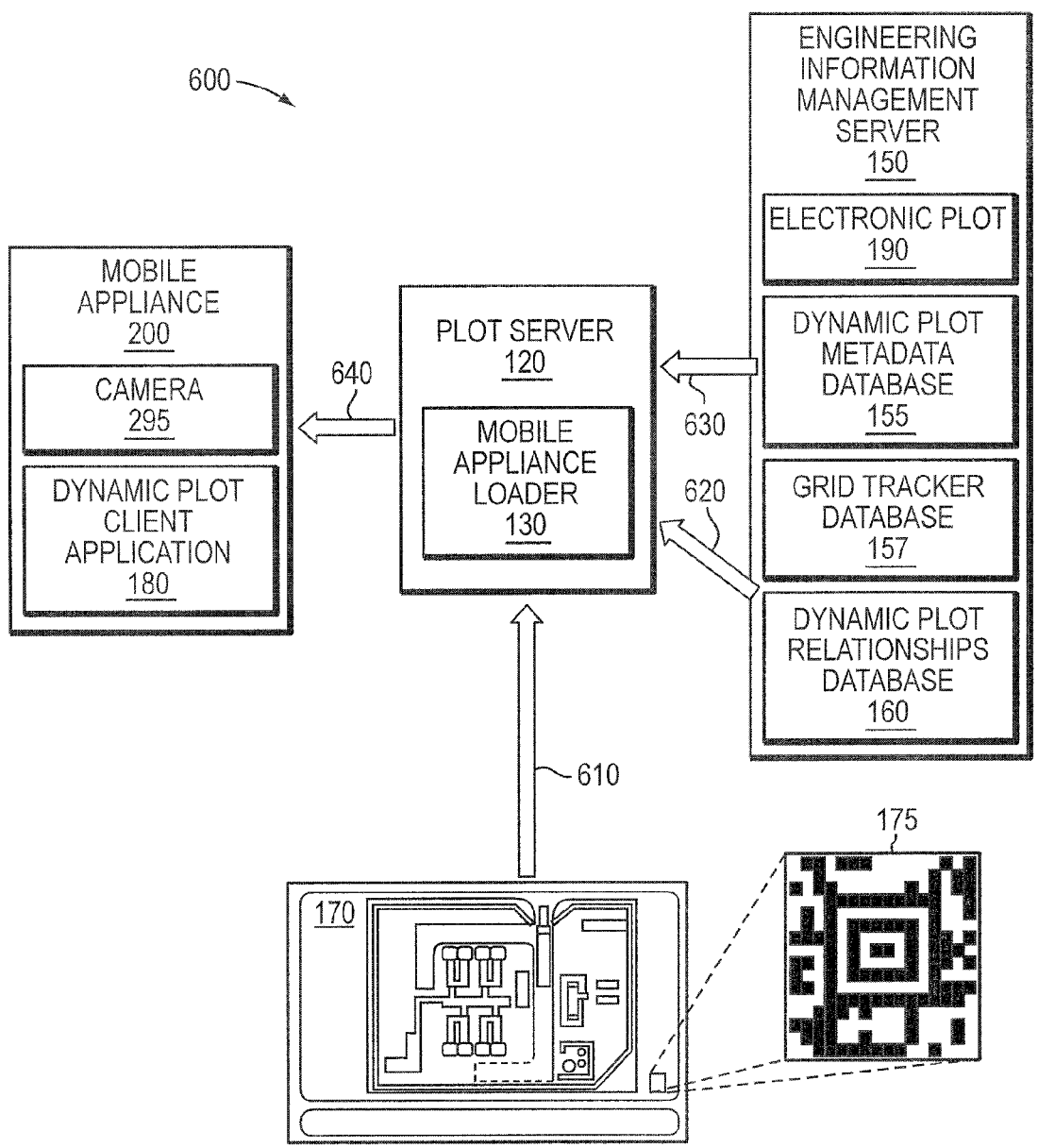
FIG. 6 is a diagram illustrating an example alternative technique where metadata for a dynamic plot is loaded in advance on the mobile appliance.

At some worksites, access to a long-range wireless connection (e.g., a 3G mobile telephony service, IEEE 802.11-wireless LAN (WLAN) connection, etc.) may not be available. FIG. 6 is a diagram 600 illustrating an example alternative technique where metadata for a dynamic plot 170 is loaded in advance on the mobile appliance 200. Before leaving the office, a field worker may collect descriptive data about a dynamic plot 170 found in a title block on the plot. At 610, the field work may enter this information into a mobile appliance loader 130 executing on the plot server 120. At 620, the mobile appliance loader 130 downloads at least a portion of the dynamic plot relationship database 160 relevant to the dynamic plot 170. At 630, the mobile appliance loader 130 downloads a set of metadata from the dynamic metadata database 155 including image patch information from the grid tracker database 157 that is relevant to the dynamic plot 170. At 640, the set of metadata including the image patch information is downloaded to the mobile appliance 200 via a wired link, for example, a USB link, or a short-range wireless connection, for example, a Bluetooth connection. The mobile appliance 200 maintains the set of metadata including the image patch information on its persistent storage device 285. Thus, when a field worker takes the mobile appliance 200 into the field, the information necessary to an augmented reality view is already pre-loaded.

Figure 7A:
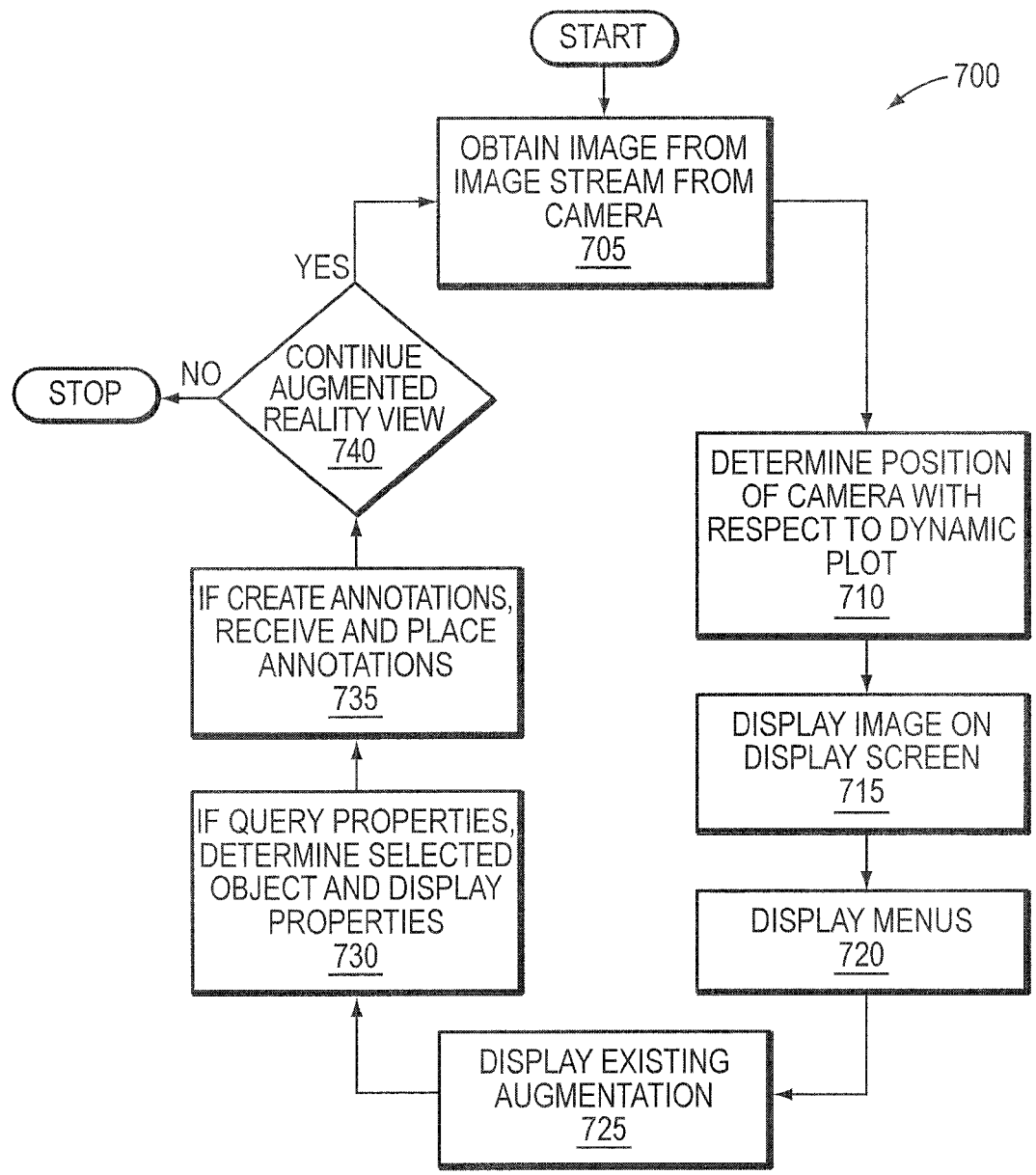
FIG. 7A is a flow diagram of an example sequence of steps for displaying an augmented reality view of a dynamic plot and interacting with the dynamic plot.

FIG. 7A is a flow diagram of an example sequence of steps 700 for displaying an augmented reality view of a dynamic plot 170 and interacting with the dynamic plot 170. For example, the sequence of steps 700 may allow a field worker to query the properties of an object in the dynamic plot using the mobile appliance 200, and such properties may be overlaid in the images shown on the display screen 260 of the mobile appliance 200. Similarly, the sequence of steps 700 may allow the field worker to annotate the plot. In such manner, additional information may be obtained beyond that printed on the dynamic plot 170 and/or additional information captured to build upon the information contained in the dynamic plot 170.

Prior to the sequence of steps 700, metadata and image patches associated with the dynamic plot 170 are obtained from the dynamic plot metadata database 155 and grid tracker database 157, using the techniques described above in relation to FIG. 5 and/or FIG. 6. Further, prior the sequence of steps 700, the field worker directs the camera 295 of the mobile appliance 200 toward at least a portion of the blueprint, schematic, etc. included in the dynamic plot 170. At step 705, an image is obtained by the dynamic plot client application 180 from a stream of images captured by the camera 295. At step 710, a pose estimation routine of the plot client application 180 determines a position of the camera 295 with respect to the dynamic plot 170. Such position of the camera 295 may be used in mapping between a coordinate space of the dynamic plot 170 and a coordinate space used with the electronic plot and the other engineering data maintained on the engineering information management server 150. Details of the use of the pose estimation routine to accomplish this task are provided further below in reference to FIGS. 8A-8E.

At step 715, the image is displayed in a user interface of the dynamic plot client application 180 on the display screen 265 of the mobile appliance 200. For example, referring back to FIG. 3, if the dynamic plot 170 depicts a schematic diagram, a portion of the schematic diagram captured by the camera 295 would be displayed in the user interface. Further, a crosshair or other type of marker 320 is overlaid upon the displayed image at a predetermined location in the image displayed, for example, at the center. The marker (e.g., crosshair) 320 may be used as a selection cursor for selecting objects (components) in the dynamic plot 170, drawing annotations on the plot, and/or interacting with the plot in other manners. That is, a user may move the mobile appliance 200, and in turn the mobile appliance's camera 295, with respect to the dynamic plot 170, such that the marker (e.g., crosshair) 320 shown in the user interface will overlay a desired object of the image shown. Then, as discussed further below, a user may query the properties of the object overlaid by the marker (e.g., crosshair) 320, annotate the object or region overlaid by the marker (e.g., crosshair) 320, or perform other types of interaction in augmented reality with the plot.

At step 720, menus of the user interface of the dynamic plot client application 180 are displayed on the display screen 265. Further, at step 725, existing annotations (e.g., redline graphics) are displayed. Such existing redline graphics may have been previously created by the user of the mobile appliance 200, for example, using the marker (e.g., crosshair) 320 in conjunction with techniques discussed below in reference to step 735, or may have been made at another location and learned from the metadata obtained from the dynamic plot metadata database 155 of the engineering information management server 150.

At step 730, a check is made to determine if a user of the mobile appliance 200 has selected a query properties function, and, if so, the properties of a selected object (component) of the dynamic plot, for example, an object overlaid by the marker (e.g., crosshair) 320 are obtained and displayed on the display screen 265 of the mobile appliance 200. In the embodiment where a long-range wireless connection is available, discussed above in reference to FIG. 5, the dynamic plot metadata database 155 of the engineering information management server 150 is queried to obtain the relevant properties. These properties are then overlaid on the images shown in the user interface of the dynamic plot client application 180 to create an augmented reality view.

Alternatively, in the embodiment where the metadata for the dynamic plot is loaded in advance on the mobile appliance 200, discussed above in reference to FIG. 6, the preloaded metadata is accessed to obtain the relevant properties. These properties are then overlaid on the images shown in the user interface of the dynamic plot client application 180 to create the augmented reality view.

Figure 7B:
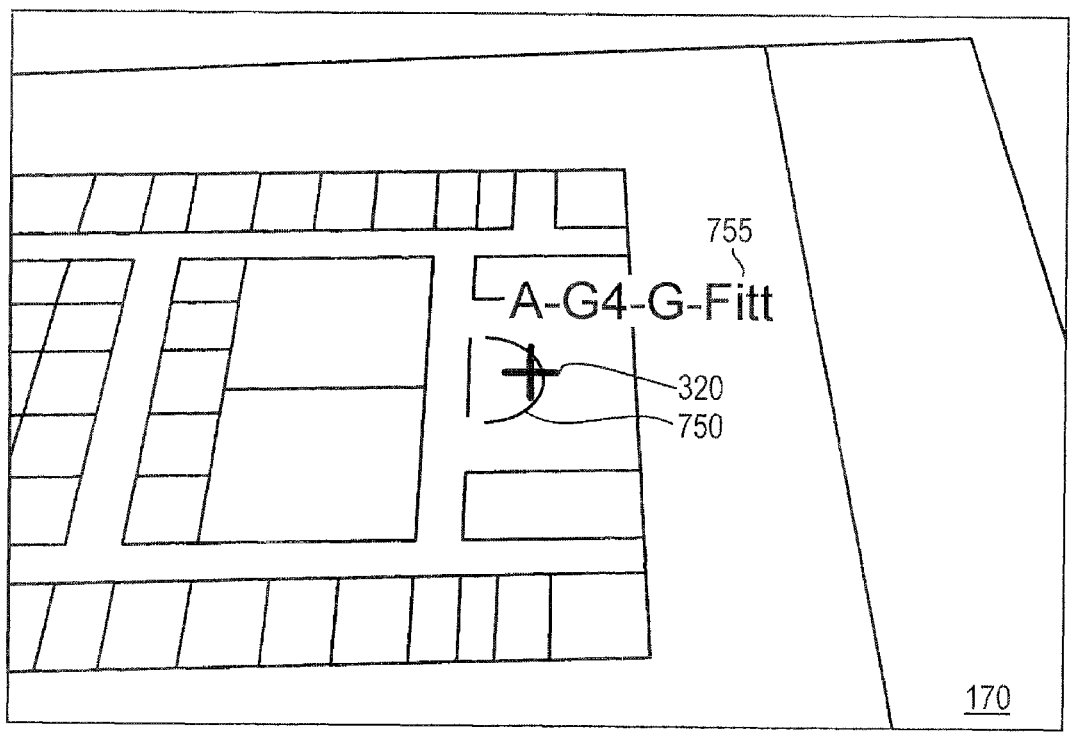
FIG. 7B is an example user interface of a dynamic plot client application illustrating the display of properties of a selected object in an augmented reality view of a dynamic plot.

FIG. 7B is an example user interface of the dynamic plot client application 180 illustrating the display of properties of a selected object in an augmented reality view of the dynamic plot 170. In FIG. 7B, a user (e.g., a field worker) has already selected a query properties function and has moved the marker (e.g., crosshair) 320 over an object 750 for which further properties are desired; properties beyond the information printed on the dynamic plot 170. In this example, the properties 755 comprise a level the object was placed on, represented by the string "A-G4-G-Fitt." Such properties 755 are overlaid on the images shown in the user interface of the dynamic plot client application 180 to create the augmented reality view.

Returning to FIG. 7A, at step 735, a check is made to determine if a user of the mobile appliance 200 has selected a create annotations function, and, if so, an annotation such as a redline, an image (e.g., a photo), a movie, an audio recording, text notes, or another type of annotation supported by the dynamic plot client application 180 is received and placed at, or near, the location in the dynamic plot overlaid by the marker (e.g., crosshair) 320. To place an annotation, a user (e.g., a field worker) may first select a location by moving the mobile appliance 200, and in turn its camera 295, such that the marker (e.g., crosshair) 320 overlays a location of interest. Such location may be selected, and a field worker may then operate one or more input devices 270 of the mobile appliance 200, such as a touchpad or keyboard, or the camera 295 itself, to create the desired annotation. For example, the field worker may select certain redline markings, for example, shapes, which may be displayed at, or about, the selected location in the augmented reality view in the user interface. Further, the field worker may type text on a keyboard of the mobile appliance 200, which may be displayed as a text note icon at, or about, the selected location in the augmented reality view. In yet another example, the field worker may point the camera 295 at a subject and take a picture. A corresponding picture icon may then be displayed at, or about, the selected location in the augmented reality view.

Figure 7C:
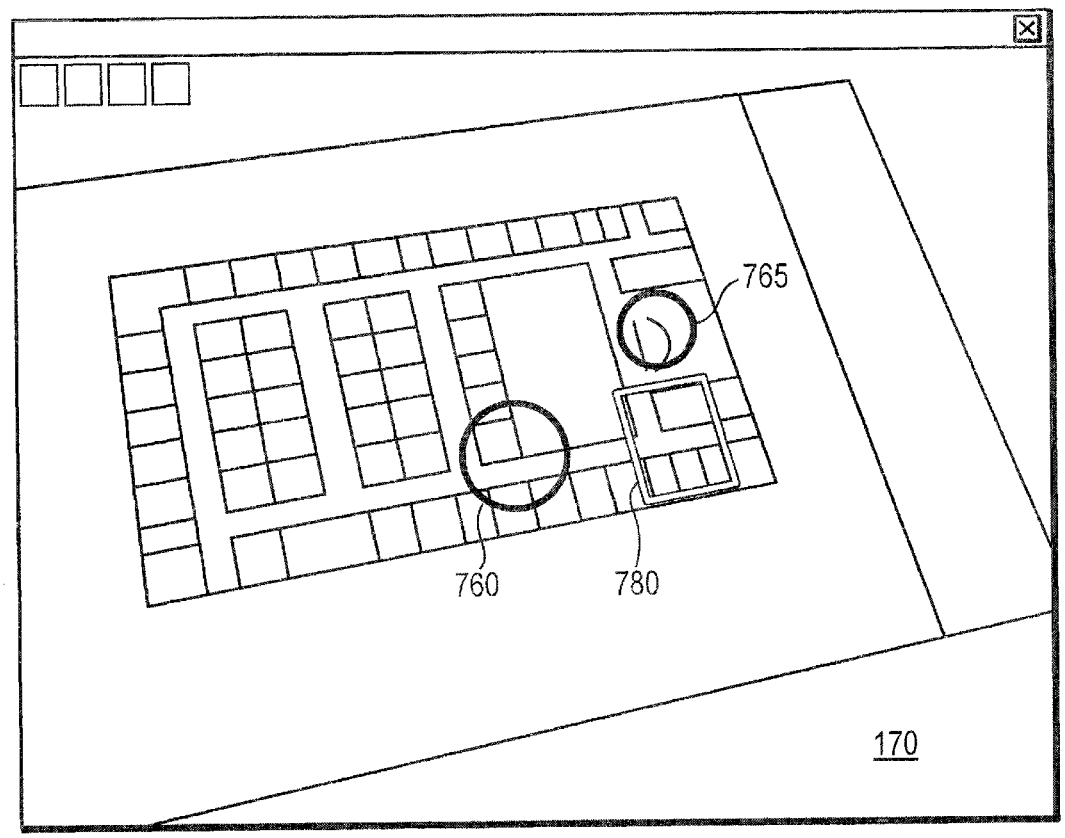
FIG. 7C is an example user interface of a dynamic plot client application illustrating several redline annotations in an augmented reality view of a dynamic plot.

FIG. 7C is an example user interface of the dynamic plot client application 180 illustrating several redline annotations in an augmented reality view of the dynamic plot 170. In this example, three redline shapes have been placed using the above discussed techniques; first and second circles 760, 765 and a square 780.

Figure 7D:
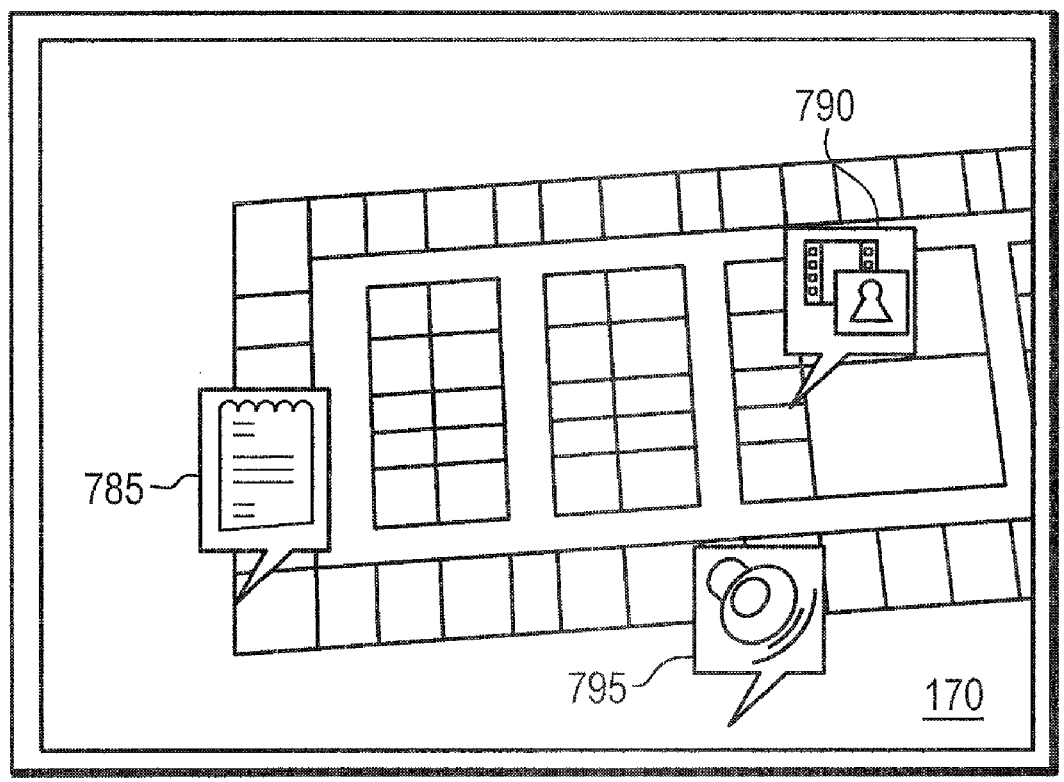
FIG. 7D is an example user interface of a dynamic plot client application illustrating further annotations in an augmented reality view of a dynamic plot.

FIG. 7D is an example user interface of the dynamic plot client application 180 illustrating further annotations in an augmented reality view of the dynamic plot 170. In this example, a text note icon 785 has been attached to a first location in an augmented reality view of the dynamic plot 170, a movie icon 790 has been attached to a second location in the augmented reality view of the dynamic plot 170, and an audio recording icon 795 has been attached to a third location in the augmented reality view of the dynamic plot 170. Selection of such icons may cause related content to be displayed in the user interface of the dynamic plot client application 180 on the mobile appliance 200.

Returning to FIG. 7A, at decision step 740, a determination is made whether to continue display of an augmented reality view. If yes, execution loops back to step 705. If a user has decides to exit and use the mobile appliance 200 in another manner, execution of the sequence of steps 700 ceases.

Figure 8A:
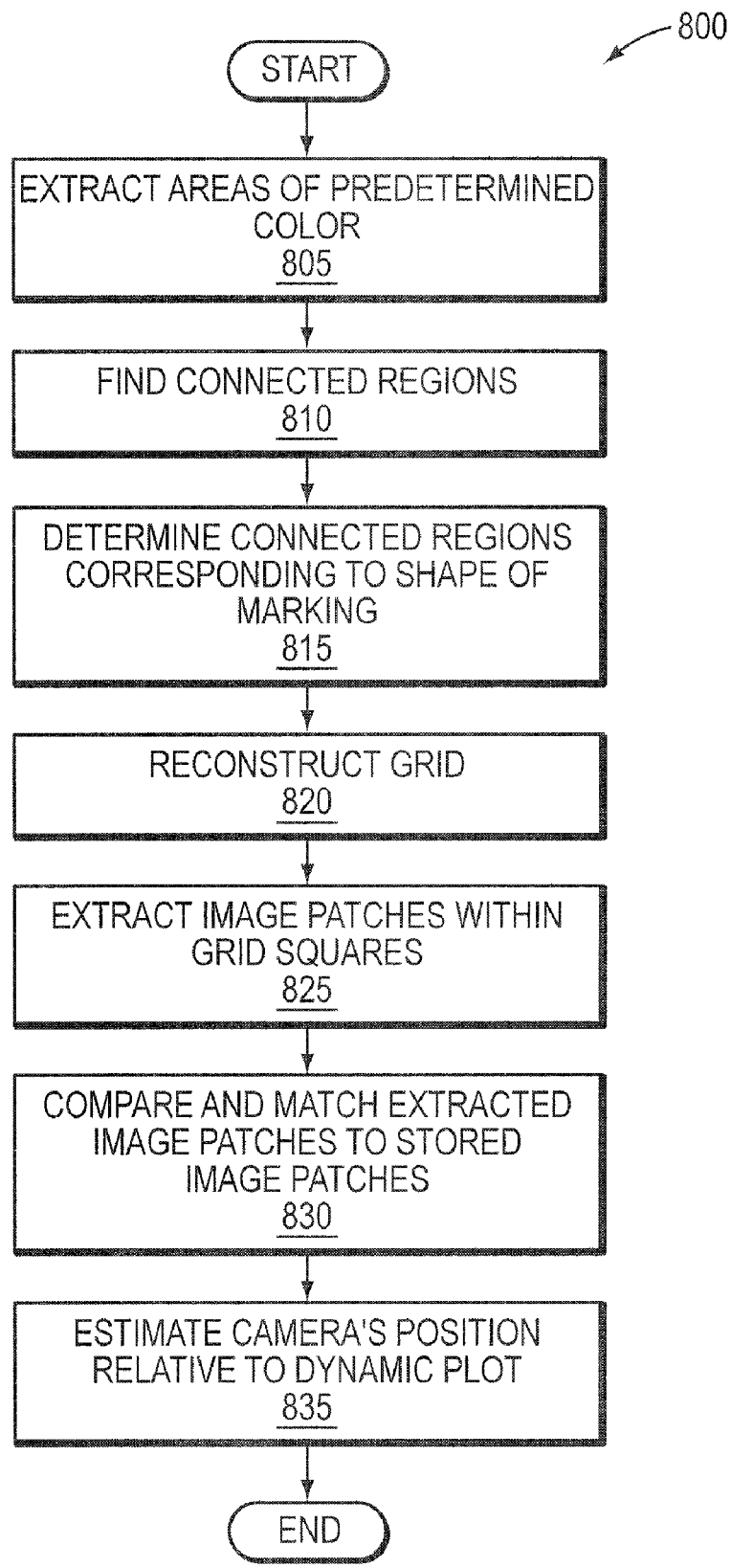
FIG. 8A is a flow diagram of an example sequence of steps executed by a pose estimation routine to determine a camera of the mobile appliance's position relative to a dynamic plot to enable display of an augmented reality view.
Figure 8B:
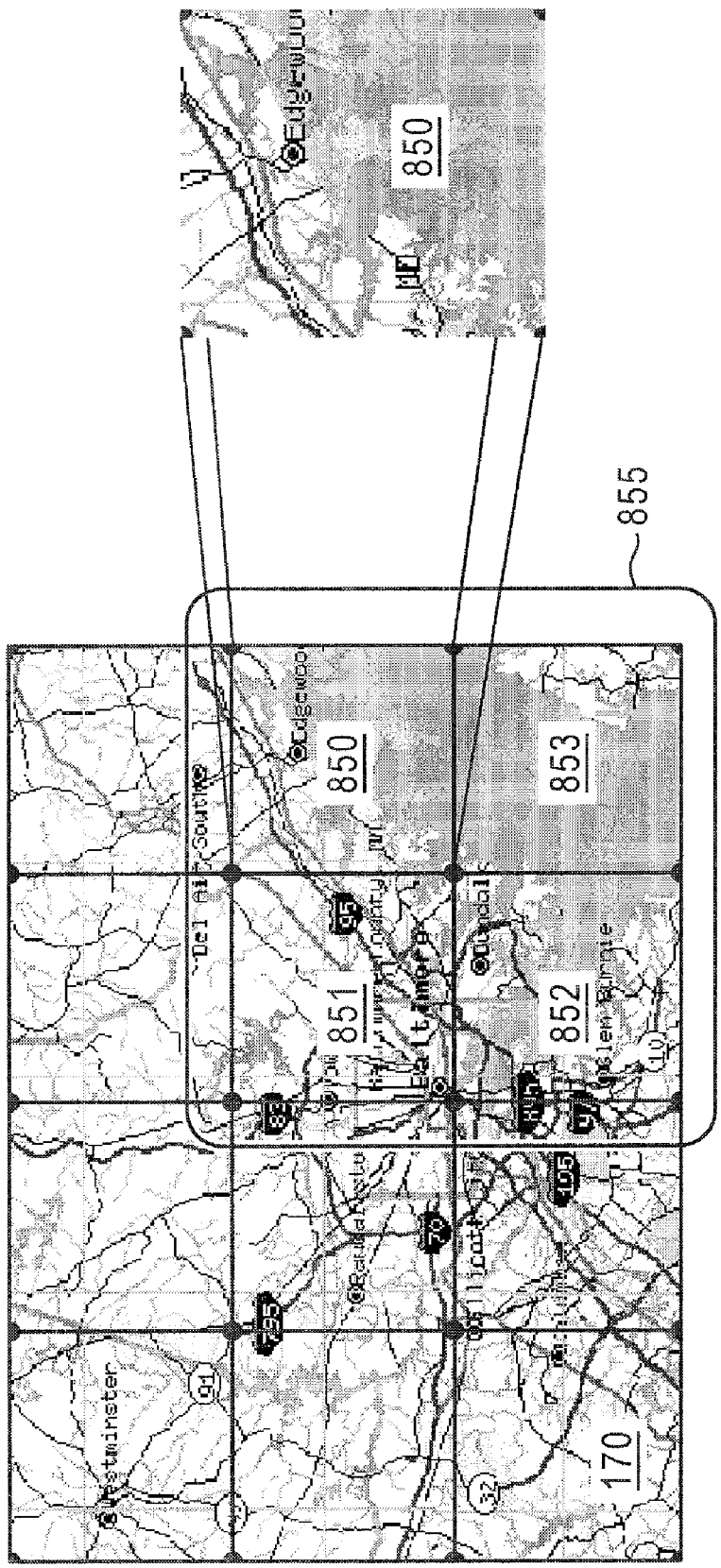
FIG. 8B is a diagram illustrating an example extraction of an image patch from a portion of a dynamic plot in an image captured by a camera of the mobile appliance.
Figure 8C:
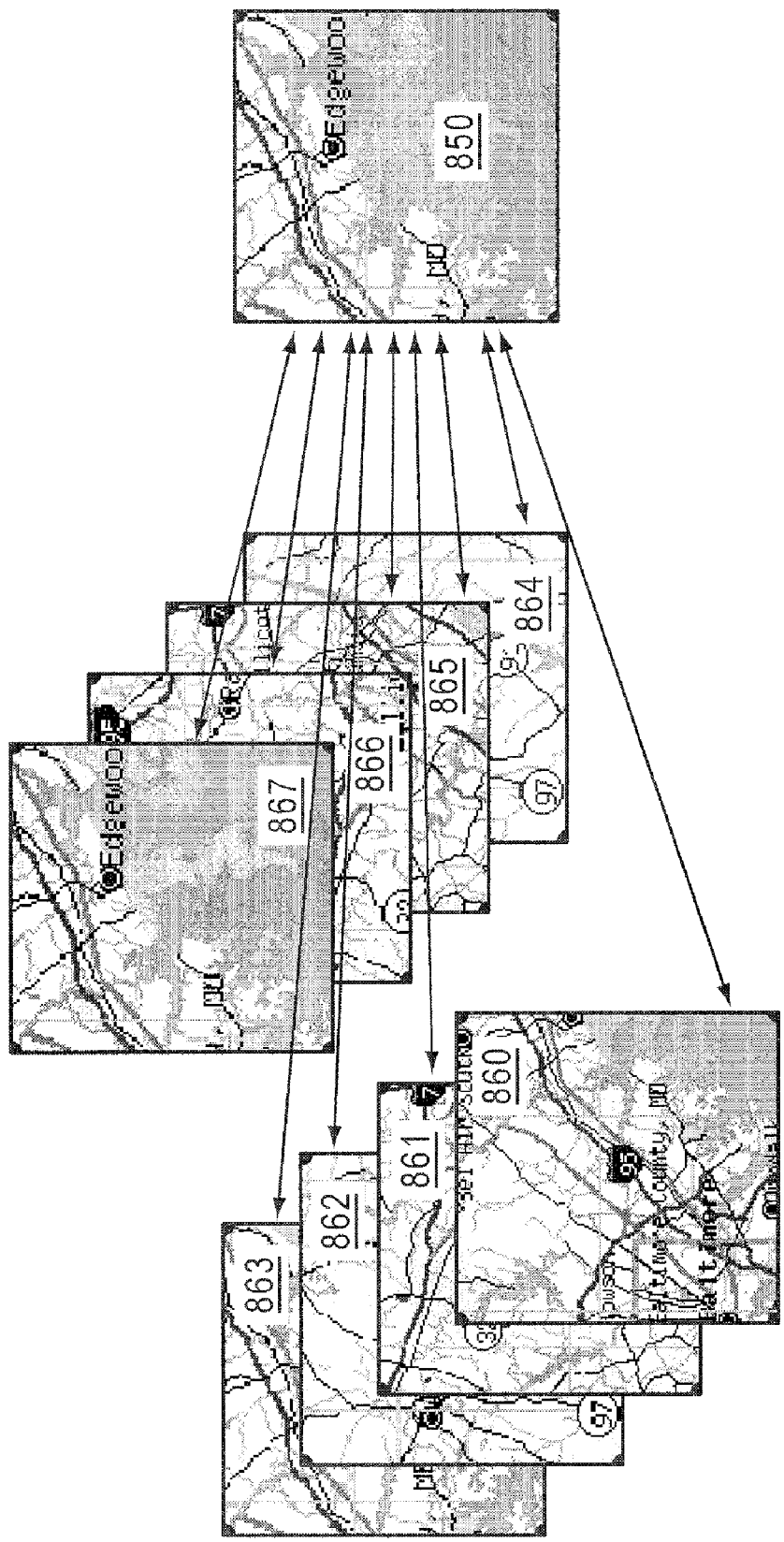
FIG. 8C is a diagram illustrating an example comparison of an image patch obtained from an image captured by a camera with stored image patches obtained from a grid tracker database.

FIG. 8A is a flow diagram of an example sequence of steps 800 executed by a pose estimation routine to determine the camera 295 of the mobile appliance's position relative to the dynamic plot 170 to enable display of an augmented reality view. Such position information is used to display properties and annotations at the correct location in the user interface of the dynamic plot client application 180, to attach annotations to the correct locations, an otherwise permit augmented reality functionality with the dynamic plot 170. As discussed above in reference to FIG. 4B, the plot server 120 may divide a plot into a grid, and at the intersection points of the grid, a marking 460 (e.g., a yellow dot) may be added and printed on the dynamic plot 170. Further, information concerning the "image patches" in each square of the grid may be stored in the grid tracker database 157 and loaded onto the mobile appliance 200.

At step 805, a pose estimation routine of the dynamic plot client application 180 examines the image of a portion of the dynamic plot 170 captured by the camera 295, and extracts areas of a predetermined color from the image (e.g., extracts yellow regions). At step 810, a contour following algorithm of the pose estimation routine finds connected regions in these areas. For example, any closed shape may be found. At step 815, a shape fitting algorithm of the pose estimation routine examines the found connected regions, and determines connected regions that are the same shape as the markings 460. For example, if the markings 460 are dots, the shape fitting algorithm may be an ellipse fitting algorithm that determines connected regions that are circles.

At step 820, using the found markings (e.g., found yellow dots) in the portion of the dynamic plot 170 captured in the image, the pose estimation routine reconstructs the grid in the coordinate space of the dynamic plot 170. At step 825, the pose estimation routine extracts the image patches within the grid squares from the portion of the dynamic plot 170 captured in the image by the camera 295. For example, referring to the example in FIG. 8B, an image patch 850 in a portion 855 of the dynamic plot 170 captured in an image by the camera 295 is extracted. Similarly, other image patches 851, 852 and 853 in the image may be extracted.

Returning to FIG. 8A, at step 830, a template matching algorithm of the pose estimation routine compares the extracted image patches to all image patches for the dynamic plot 170 obtained from the grid tracker database 157, to determine a match. For example, referring to FIG. 8C, the image patch 850 obtained from the image captured by the camera 295 may be compared with stored image patches 860-867 obtained from the grid tracker database 157, and determined to match stored image patch 867.

Figure 8D:
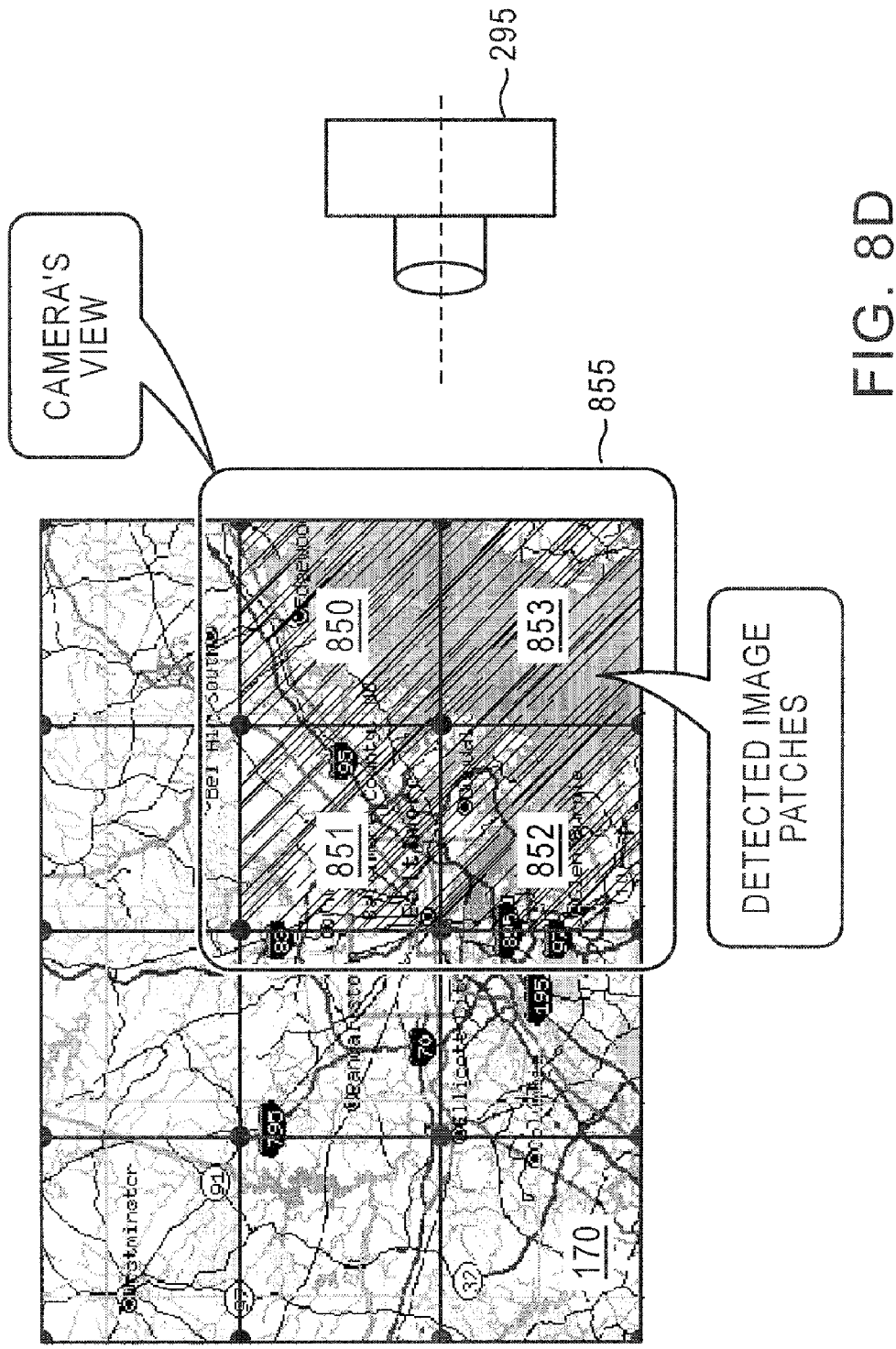
FIG. 8D is a diagram illustrating example use of image patches and a region of the camera's view to estimate the camera's position relative to the dynamic plot.

Returning to FIG. 8A, at step 835, given the camera's view and the detected image patches 850-853, the camera's position relative to dynamic plot 170 is estimated. The more image patches that are detected, the more accurate the position estimation may be. For example, referring to FIG. 8D, given that image patches 850-853 are detected and the camera's view includes region 870, the camera's position relative to the dynamic plot 170 is determined to a reasonable degree of error.

After a user has added additional information (e.g., annotations) to the dynamic plot, the annotations can be shared with other workers who may be working on the project. In the embodiment where a long-range wireless connection is available, discussed above in reference to FIG. 5, the annotations may be shared quickly by unloading them over the long-range wireless connection. In the embodiment where the metadata for the dynamic plot is loaded in advance on the mobile appliance 200, discussed above in reference to FIG. 6, the annotations may be stored, for example, in the persistent storage device of the mobile appliance 200, until the field work returns to the office, and unloads them.

Figure 9:
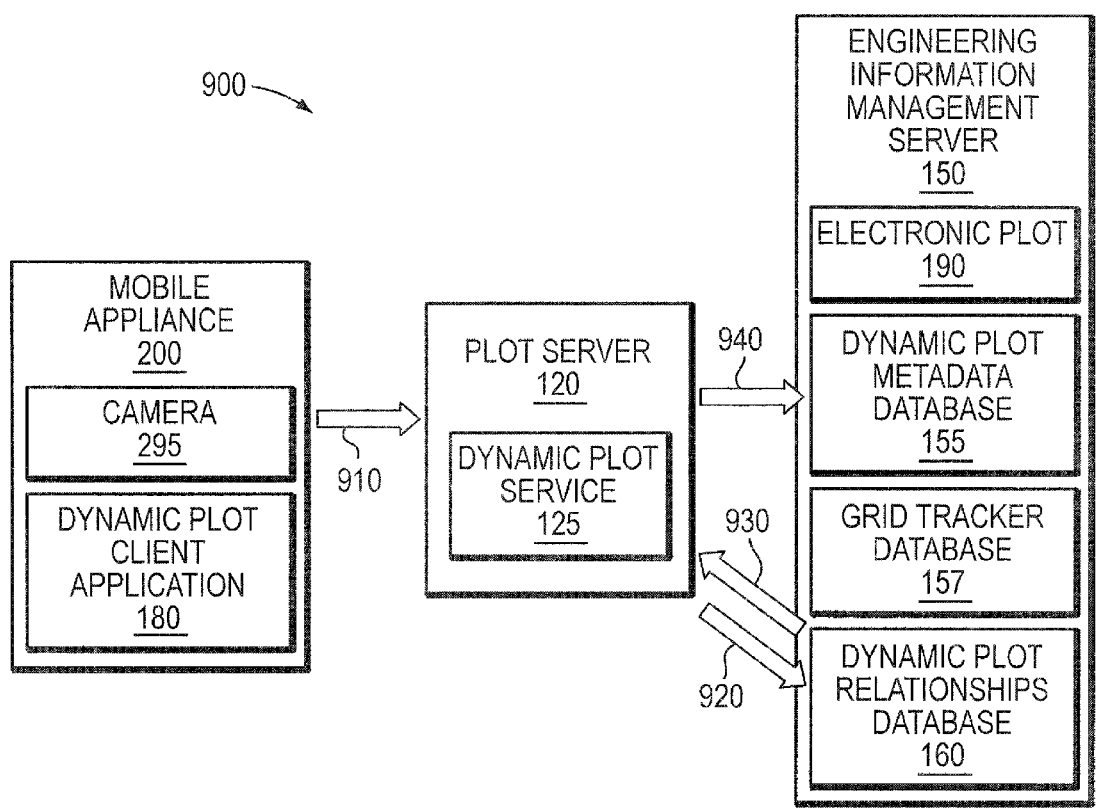
FIG. 9 is a diagram illustrating an example technique for unloading annotations from the mobile appliance to share them with other workers who may be working on the project.

FIG. 9 is a diagram 900 illustrating an example technique for unloading annotations from the mobile appliance 200 to share them with other workers who may be working on the project. On the mobile appliance 200, the dynamic plot client application 180 maintains the annotations in reference to the coordinate system of the dynamic plot 170. When a user saves the annotations, the dynamic plot client application 180 forwards, at 910, the annotations and any other metadata to the dynamic plot service 125 executing on the plot server 120. Depending on the embodiment, such forwarding may be over a long-range wireless connection, a wired link, a short-range wireless connection, etc. At 920, the dynamic plot service 125 executing on the plot server 120 queries the dynamic plot relationships database 160 for the GUID and other payload information used in identifying corresponding metadata in the engineering information management server 150. For example, the electronic plot 190 that the dynamic plot 170 was printed from may be identified. Further, the plot server 120 queries the dynamic plot relationships database 160 for mapping information between the coordinate system of the dynamic plot 170 and the coordinate system used with the electronic plot 190 stored in the engineering information management server 150, so that the annotations may be aligned with the features of electronic plot 190. At 930, this information is returned to the dynamic plot service 125 on the plot server 120. Using this information, the dynamic plot service 125 transforms and annotates the electronic plot 190 to create a redline version that can be displayed to others. At 940, the electronic plot 190 is saved and the dynamic plot metadata database 155 is updated on the engineering information management server 150.

While the above description discusses various embodiments of the present disclosure, it should be apparent that a number of modifications and/or additions may be made without departing from the disclosure's intended spirit and scope.

For example, in addition to allowing query of properties of objects in the dynamic plot 170 and the capture of annotations, a variety of other types of functionality may be provided within the architecture described above. For instance, the unique plot ID decoded from the identifier (e.g., barcode) 175, on the dynamic plot 170 may be used in determining provenance of the dynamic plot 170. For example, the unique plot ID may be used to look up information maintained in the engineering information management server 150 that indicates when the particular plot was created, and if there has been later plots. This information may be communicated back to the dynamic plot creation client application 180 on the mobile appliance 200, to provide the field worker with the status of the dynamic plot 170.

Further, the architecture described above may be used to permit three-dimensional (3D) examination of features represented in the two-dimensional dynamic plot 170. After selecting the 3D examination command, a field worker may point the camera 295 of the mobile appliance 200 the dynamic plot 170, and available 3D objects may be shown. The field worker may select one or more desired objects and a corresponding 3D model for each may be displayed in the user interface of the dynamic plot creation client application 180 on the display screen 260 of the mobile appliance 200. The 3D model may be shown as if it were sitting on the image of the dynamic plot 170 shown in the user interface, with 3D model elements extending from appropriate locations in the image. Simply moving the camera 295 may provide a different view of the 3D model. The model remains attached to the image of the dynamic plot 170, appearing as if it extends up from the printed page.

Further, it should be understood that many of the above-described techniques may be implemented in software, in hardware, or a combination thereof. A software implementation may include computer-executable instructions stored in a computer-readable medium, such as a volatile or persistent memory, a hard-disk, a compact disk (CD), etc. A hardware implementation may include processors, memories, programmable logic circuits, application specific integrated circuits, and/or other types of hardware components. Further, a combined software/hardware implementation may include both computer-executable instructions stored in a computer-readable medium, as well as one or more hardware components. Accordingly, it should be understood that the above descriptions are meant to be taken only by way of example.

What is claimed is:

1. A method comprising:
   printing a dynamic plot;
   obtaining, by a mobile appliance, metadata corresponding to the dynamic plot;
   capturing, by a camera of the mobile appliance, an image of the dynamic plot;
   calculating a position of the camera of the mobile appliance with respect to the dynamic plot from the image of the dynamic plot;
   displaying the image captured by the camera of the dynamic plot on a display screen of the mobile appliance;
   placing, in response to input by a user on the mobile appliance, an annotation at a selected location in the image captured by the camera of the dynamic plot; and
   using the calculated position of the camera, updating the metadata corresponding to the dynamic plot to reflect the added annotation.

2. The method of claim 1 wherein the printing further comprises:
   assigning the dynamic plot a unique plot identifier (ID);
   adding an identifier that indicates the unique plot ID to the dynamic plot; and
   printing the dynamic plot with the added identifier.

3. The method of claim 2 wherein the added identifier is a barcode.

4. The method of claim 2 wherein the printing further comprises:
   creating an entry in a database that maps the unique plot ID of the dynamic plot to information that identifies the metadata corresponding to the dynamic plot.

5. The method of claim 4 wherein the obtaining further comprises:
   capturing, by the camera of the mobile appliance, an image of the identifier on the dynamic plot;
   decoding the identifier to determine the unique plot ID of the dynamic plot; and
   using the unique plot ID to access the metadata corresponding to the dynamic plot.

6. The method of claim 1 further comprising:
   using the calculated position to overlay additional information or icons beyond what is printed on the dynamic plot at particular locations in the image captured by the camera of the dynamic plot; and
   displaying the image captured by the camera of the dynamic plot with the overlaid information or icons on the display screen of the mobile appliance.

7. The method of claim 6 wherein the additional information comprises properties of an object printed on the dynamic plot.

8. The method of claim 6 wherein the additional information comprises an annotation created by a user of the mobile appliance.

9. The method of claim 6 wherein the icons comprises one or more of a text note icon, an audio note icon, picture icon and a movie icon.

10. The method of claim 1 further comprising:
    overlaying a marker at a predetermined location in the image captured by the camera of the dynamic plot; and
    using the marker as a selection cursor to select objects in the dynamic plot, draw annotations on the dynamic plot or interact with the dynamic plot.

11. The method of claim 10 wherein the marker is a crosshair and the predetermined location is the center of the image captured by the camera of the dynamic plot.

12. The method of claim 1 wherein the obtaining further comprises:
    accessing, by the mobile appliance, one or more servers, via a long-range wireless connection, the one or more servers maintaining a dynamic plot metadata database; and
    retrieving at least some metadata corresponding to the dynamic plot over the long-range wireless connection from the dynamic plot metadata database.

13. The method of claim 1 wherein the obtaining further comprises:
    loading the mobile appliance, at a first location, with at least a portion of a dynamic plot metadata database via a wired or short-range wireless connection; and
    transporting the mobile appliance to a second location, remote from the first location, prior to the capturing, calculating, displaying, placing and updating.

14. The method of claim 1 wherein the updating further comprises:
    accessing a mapping between a coordinate system of the dynamic plot and a coordinate system used with engineering data; and
    transforming the annotations based on the mapping.

15. The method of claim 14 further comprising:
    creating a version of an electronic plot including the transformed annotations; and
    saving the version of the electronic plot on one or more servers accessible to other users.

* * * * *